Aug. 24, 1954     C. C. MINTER     2,687,035
DEWPOINT INDICATOR
Filed Nov. 20, 1950
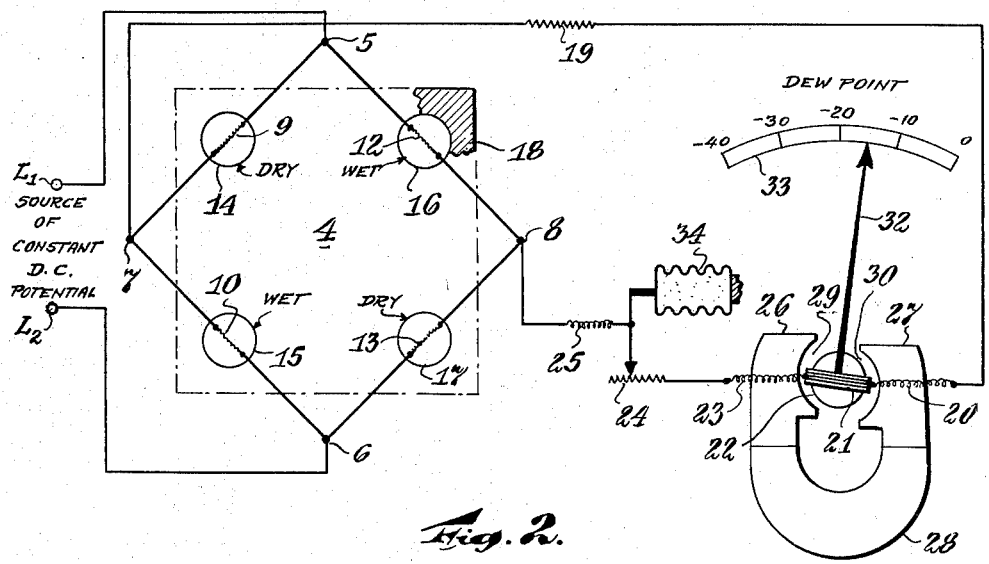
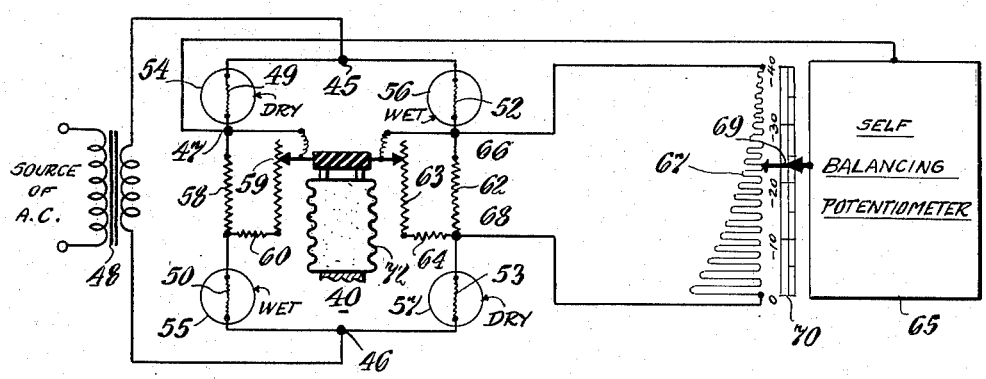
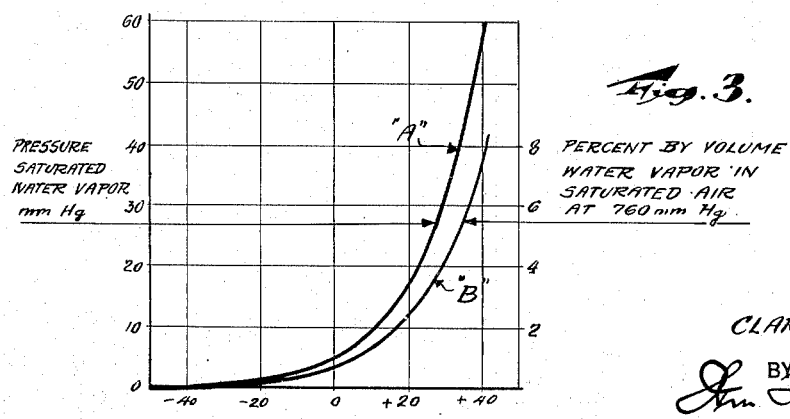
INVENTOR
CLARKE C. MINTER.
BY
ATTORNEY Patented Aug. 24, 1954

2,687,035

UNITED STATES PATENT OFFICE 2,687,035

DEWPOINT INDICATOR

Clarke C. Minter, Washington, D. C., assignor to Minter Instrument Corporation, New York, N. Y., a corporation of New York Application November 20, 1950, Serial No. 196,579

8 Claims. (Cl. 73—17)

The present invention relates to a device for determining the dewpoint of the atmosphere and more especially to a dewpoint indicator which is accurate and reliable in giving a direct reading of the dewpoint at all times and under all climatic conditions.

Devices of this nature are known to the art but have heretofore been unsatisfactory because of errors which arise thus making them unreliable for the intended purpose. For example, one of the most commonly employed types of indicators is that of the condensation type. Aside from errors in reading, due to faulty technique, this condensation type possesses the objectionable disadvantage that it is difficult to use below the freezing point of water because of the formation of ice on the condensation mirror.

It is accordingly the primary object of the present invention to provide a dewpoint indicator which will give a direct indication of the dewpoint without having to condense the water vapor in the air.

Another object of the present invention is the provision of a dewpoint indicator which will continuously indicate changes in the dewpoint.

Another object of the present invention is the provision of a dewpoint indicator that is accurate and reliable under all climatic conditions.

Still further objects of the present invention will become obvious to those skilled in the art by reference to the accompanying drawing wherein:

Figure 1 is a schematic illustration of one form which the dewpoint indicator of the present invention may take when utilizing a direct current source of electric power, Fig. 2 is a schematic illustration of a modification which the dewpoint indicator of the present invention may take when utilizing an alternating current source of electrical power and, Fig. 3 is a graphic illustration showing the variation with temperature of the pressure of saturated vapor and the variation of the percent of water vapor in saturated air at 760 mm. Hg.

By reference now to the drawing, the apparatus of the present invention as therein shown for obtaining a direct indication of changes in dewpoint, utilizes apparatus for measuring the difference between a physical property of dry air and moist air, such as the thermal conductivity of the air under these conditions. Although the increase in thermal conductivity produced by the addition of water vapor to air is rather small, and hence errors have heretofore occurred in systems using thermal conductivity comparison between dry and moist air, it will become readily apparent as the description of the present invention progresses that such errors are practically eliminated by the present invention.

Referring first to Fig. 3, wherein the abscissa represents temperature in degrees centigrade, the left hand ordinate pressure in millimeters of mercury, and the right hand ordinate percent by volume of water vapor in saturated air at 760 mm. Hg, it will be noted from curve "A" that the pressure increases exponentially with temperature. The significance of this in terms of dewpoint is obvious when it is appreciated that by definition dewpoint is the temperature at which the air becomes saturated with the moisture it contains. Thus by reference to curve "A," it will be clear that if the absolute pressure of water vapor in the air is about 4.579 mm. Hg the air becomes saturated at 0° C., which is by definition the dewpoint. Since moist air can for present purposes be regarded as a binary mixture composed of dry air and water vapor, it is obvious from curve "B" that the percent by volume of water vapor in saturated air for a barometric pressure of 760 mm. Hg, follows substantially the curve "A."

Due to the substantial similarity of these two curves, a thermal conductivity comparison is made by the present invention which is dependent upon volume percentage of water vapor, in lieu of absolute pressure of water vapor which governs the dewpoint. Inasmuch as the volume percent curve "B" also increases exponentially with temperature, a scale is employed by the present invention which is calibrated in terms of temperature instead of in terms of percent by volume of water vapor, using the relation expressed by the curves of Fig. 3 and to measure the thermal conductivity of dry air and the atmosphere, to determine the dewpoint of the latter. A given absolute pressure of water vapor in the atmosphere then becomes "X" percent by volume of water vapor in dry air, which has a definitely greater thermal conductivity than the dry air and such difference in thermal conductivity is then shown by means of the aforementioned indicator having a scale calibrated in temperature from which the dewpoint can be read directly.

Referring now more particularly to Fig. 1, a constant source of direct-current potential L1 and L2 supplies current to a Wheatstone bridge 4 having input terminals 5 and 6 and output terminals 7 and 8. Each leg of the bridge is provided with similar current-heated bridge elements 9, 10, 12 and 13 enclosed in cells 14, 15, 16 and 17, the latter of which are mounted in a metal block 18, such as shown and described more in detail in my copending application, Serial No. 196,580, filed concurrently herewith.

The cells 14, 15, 16 and 17 are open to the atmosphere but the moisture in the air entering cells 14 and 17 is removed by a suitable drying agent with such dry air diffusing into the cells 14 and 17 in the manner well known in the art. Output terminal 7 of the bridge 4 is connected through a suitable temperature sensitive resistance 19 and a spring-like lead 20, to one end of a moving coil 21 surrounding an iron core 22, while the other end of this coil 21 is connected through another spring-like lead 23 and variable rheostat 24 having a spring-like lead 25, to the other output terminal 8 of the bridge 4.

The moving coil 21 rotates between pole pieces 26 and 27 carried by the ends of a permanent magnet 28 with such pole-pieces forming air-gaps 29 and 30 with the moving coil 21, which gaps increase in length approximately exponentially as the coil rotates in a clockwise direction. A pointer 32 is carried by the coil 21 and core 22 which registers with a linear scale 33 calibrated in degrees centrigrade or Fahrenheit for directly indicating the dewpoint. Variable rheostat 24 is operated by an evacuated spring bellows 34.

The output from the bridge 4 at the terminals 7 and 8 thus represents a current resulting from the difference in thermal conductivity between the dry air entering cells 14 and 17 and the moist air entering cells 15 and 16. Since it is clear from Fig. 3 that the percent by volume of water vapor in saturated air increases exponentially with temperature, it is necessary to control the indicated output when a linear dewpoint scale is to be utilized on the indicator. This is done in accordance with the present invention by forming the air-gaps 29 and 30 so that their length likewise increases approximately exponentially as the coil rotates in a clockwise direction, as previously mentioned. Since the torque developed by the moving coil 21 is the product of the current from the bridge and the density of the magnetic flux in the gaps 29 and 30, it follows that since the output from the bridge 4 increases almost exponentially with temperature, by employing an air-gap in which the flux density simultaneously decreases almost exponentially as the coil rotates to move the pointer 32 upscale, a linear scale 33 can be employed to give a direct and accurate dewpoint indication.

In the absence of provisions to the contrary, a small error would result due to the difference in temperature coefficients of thermal conductivity of air and water vapor and since the temperature coefficient of conductivity of water vapor is about 50% greater than that of air, the output from the bridge 4 produced by a given percent of water vapor will increase as the ambient temperature increases. The magnitude and temperature coefficient of resistance 19 in series with the moving coil 21 is accordingly selected so as to eliminate this small error.

A still further error which would occur in the absence of provisions to the contrary resides in the fact that even when the absolute pressure of water vapor is constant any variation in the magnitude of the barometric pressure will produce a change in the percent by volume of water vapor and consequently a change in the indicated dewpoint. For example, an increase in barometric pressure decreases the thermal conductivity of moist air containing a given absolute pressure of water vapor and the indicated dewpoint would be too low. This error is eliminated in accordance with the present invention by the variable rheostat 24 which is also in series with the output of the bridge 4 and the moving coil 21. Accordingly, as the barometric pressure increases, the evacuated spring bellows 34 will decrease in volume, since one end is secured in a fixed position, and move the sliding contact of the rheostat 24 so as to decrease the magnitude of the resistance of such rheostat in series with the moving coil, thereby increasing the current through the moving coil 21 and compensating for the otherwise error due to variation in barometric pressure.

The modification of the present invention as shown in Fig. 2 differs from that as above described relative to Fig. 1, mainly in the fact that this modification operates from an alternating current supply source such as a transformer 48 having its secondary winding connected to the input terminals 45 and 46 of the bridge 40 with such bridge 40 being identical to that as above described relative to Fig. 1 so far as the current-heated elements 49, 50, 52, and 53 within the respective cells 54, 55, 56, and 57, are concerned. However, connected between the cells 54 and 55 is a fixed inert resistance 58 shunted by a variable inert rheostat 59 in series with a fixed temperature sensitive resistance 60, which are connected to one of the output terminals 47 of the bridge 40. Similarly a fixed inert resistance 62 is connected between the cells 56 and 57 which resistance is shunted by an inert variable rheostat 63 in series with a fixed temperature sensitive resistance 64, with the resistance of this combination 62, 63, 64 and 67 being equal to the resistance of the combination of the resistances 58, 59 and 60 in the other leg of the bridge 40. The potential drop across the two combinations of resistances is known as the "span" and is the potential due to the difference between the thermal conductivity of dry air and that of air saturated with water vapor at a selected temperature of say 0° C.

The output terminal 47 is connected to the amplifier of a self-balancing potentiometer 65, while an output terminal 66 of the bridge 40 is connected to one end of the windings 67 of the potentiometer 65 which has its other end connected to a further output terminal 68 of the bridge 40. The potentiometer pointer 69 moves over a linear scale 70, calibrated in the same manner as the scale 33 of Fig. 1, simultaneously with movement of the pointer over the windings 67. It is also to be noted that the potentiometer windings 67 are so wound as to vary approximately exponentially from end to end. The variable inert rheostats 59 and 63 are moved by an evacuated spring bellows 72 similar to that of the bellows 34 of Fig. 1. The self-adjusting electronic type potentiometer per se forms no part of the present invention and is well known to the art of potentiometers, although so far as I am aware no self-adjustable potentiometer has had its windings vary in resistance exponentially and particularly in accordance with a curve, such as shown in Fig. 3.

Fundamentally the operation of the modification shown in Fig. 2 is identical to that of Fig. 1. Errors due to changes in ambient temperature are compensated for by the resistances 60 and 64 since the latter possess enough temperature sensitivity to increase the "span" sufficiently as the ambient temperature increases to compensate for the error otherwise resulting due to the greater temperature coefficient of thermal conductivity of water vapor as compared with that of air. Similarly, the error otherwise occurring due to an increase in barometric pressure is compensated for by operation of the variable rheostats 59 and 63 which are regulated by the evacuated spring bellows 72. As the barometric pressure increases the evacuated spring bellows decreases in length, since its lower end is secured in a stationary position, which thereby decreases to an essentially equal extent the magnitude of the resistances 59 and 63. This accordingly decreases the total resistance of the "span" and changes the total potential drop thereacross causing the potentiometer pointer 69 to move upscale thereby compensating for the increase in barometric pressure.

It thus becomes obvious to those skilled in the art that a direct reading dewpoint indicator is provided by the present invention which is exceptionally accurate and reliable. Moreover, such indicator is unaffected by climatic conditions and hence may be used either inside buildings or outside. By providing compensation for errors which would otherwise occur due to changes in ambient temperature and barometric pressure, the dewpoint indicator of the present invention is entirely reliable under all conditions.

Although two embodiments of the present invention have been shown and described, it is to be understood that still further modifications thereof may be made without departing from the spirit and scope of the appended claims.

I claim:

1. A dewpoint indicator for directly measuring the dewpoint of the atmosphere comprising a Wheatstone bridge having a potential difference across its output terminals representing the difference between the thermal conductivity of dry air and that of the moist atmosphere to be measured, an essentially linear scale calibrated in dewpoint temperature degrees, electrically operable means provided with an indicating pointer and operable to cause movement of said pointer over said scale in response to the occurrence of a difference of potential across the output terminals of said bridge, and electrical compensating means responsive to ambient temperature and barometric pressure connected between the output terminals of said bridge and said electrically operable means for moving said pointer to compensate for ambient temperature and barometric pressure variations on said bridge which affects the potential differences across the output terminals of said bridge.

2. A dewpoint indicator for directly measuring the dewpoint of the atmosphere comprising a Wheatstone bridge for measuring the thermal conductivity of dry air and that of the moist atmosphere to be measured and provided with output terminals having a potential difference thereacross representing the difference in thermal conductivity of the dry air and that of the moist atmosphere to be measured, an essentially linear scale calibrated in dewpoint temperature degrees, electrically operable means provided with an indicating pointer and connected to the output terminals of said bridge and operable to cause movement of said pointer over said scale, and electrical compensating means responsive to ambient temperature and barometric pressure connected between said bridge and electrically operable means for said pointer to compensate for ambient temperature and barometric pressure variations on said bridge which affects its output.

3. A dewpoint indicator for directly measuring the dewpoint of the atmosphere comprising a Wheatstone bridge for measuring the difference between the thermal conductivity of dry air and that of the moist atmosphere to be measured, a circuit connected to the output terminals of said bridge including the series connection of a temperature responsive resistance to compensate for changes in ambient temperature, a pressure responsive resistance to compensate for changes in barometric pressure and a movable coil; an indicating pointer connected to said movable coil, a linear scale calibrated in terms of dewpoint temperature in the path of movement of said pointer, and a magnetic field decreasing approximately exponentially in the path of movement of said coil toward the upscale movement of said pointer.

4. A dewpoint indicator for directly measuring the dewpoint of the atmosphere comprising a Wheatstone bridge for measuring the difference in thermal conductivity of dry air and that of the moist atmosphere to be measured, a movable coil disposed between the pole pieces of a magnet and connected to the output of said bridge and provided with a pointer, a linear scale calibrated in dewpoint temperature degrees in the path of movement of said pointer, an air-gap between the pole pieces of said magnet the length of which increases approximately exponentially in the direction of movement of said coil which causes upscale movement of said pointer, a temperature sensitive resistance in series with the output of said bridge and said movable coil to compensate for variations in ambient temperature, a pressure responsive resistance connected to the output of said bridge and to said movable coil to compensate for variations in barometric pressure, and an evacuated spring-like bellows operable by changes in barometric pressure connected to said pressure responsive resistance to operate the latter.

5. A dewpoint indicator operable from an alternating current source of supply for directly measuring the dewpoint of the atmosphere comprising a Wheatstone bridge for measuring the difference between the thermal conductivity of dry air and that of the moist atmosphere to be measured and provided with input terminals, each of the two similar arms of said bridge being connected to said input terminals and including a pair of current-heated bridge elements one being subjected to dry air and the other to the moist atmosphere to be measured, a network of resistors connected in each arm of said bridge whose total resistance is substantially equal to each other, each similar network of resistors including a fixed inert resistor, a temperature sensitive resistor and a pressure responsive resistor; a self-balancing electronic type potentiometer connected to the output terminals of said bridge having a slidewire whose resistance varies approximately exponentially between its ends, an essentially linear scale calibrated in terms of dewpoint temperature degrees, and a pointer attached to the movable contact of said slidewire and movable over said scale to indicate the dewpoint of the atmosphere.

6. A dewpoint indicator for directly measuring the dewpoint of the atmosphere comprising a Wheatstone bridge having potential differences across its output terminals representing the difference between the thermal conductivity of dry air and that of the moist atmosphere to be measured, an essentially linear scale calibrated in dewpoint temperature degrees, electrically operable means provided with an indicating pointer and operable to cause movement of said pointer over said scale in response to the potential differences across the output terminals of said bridge, and electrical compensating means including a fixed resistance responsive to temperature variations and a variable resistance responsive to barometric pressure changes and connected to the output terminals of said bridge and to said electrically operable means and operable to compensate for ambient temperature and barometric pressure variations on said bridge which affects the potential differences between the output terminals of said bridge.

7. A dewpoint indicator for directly measuring the dewpoint of the atmosphere comprising a Wheatstone bridge having potential differences across its output terminals representing the differences between the thermal conductivity of dry air and that of the moist air to be measured, an essentially linear scale calibrated in dewpoint temperature degrees, electrically operable means provided with an indicating pointer and operable to cause movement of said pointer over said scale in response to the potential differences across the output terminals of said bridge, means forming part of said electrically operable means for causing an exponential displacement of said pointer relative to the magnitude of the potential differences across the output terminals of said bridge, and compensating means responsive to ambient temperature and barometric pressure connected to said bridge and to said electrically operable means and operable to cause movement of said pointer to compensate for ambient temperature and barometric pressure variations on said bridge which affects the potential differences across the output terminals thereof.

8. A dewpoint indicator for directly measuring the dewpoint of the atmosphere comprising a Wheatstone bridge for measuring the difference between the thermal conductivity of dry air and that of the moist air to be measured and provided with output terminals having exponentially varying potential differences thereacross representing the differences in thermal conductivity of dry air and that of the moist air to be measured, an essentially linear scale calibrated in dewpoint temperature degrees, controllable electrical means provided with an indicating pointer and actuated by the exponential variation of potential differences impressed thereon by said bridge to cause movement of said pointer over said scale, and compensating means responsive to ambient temperature and barometric pressure connected to said bridge and to said controllable electrical means and operable to compensate for ambient temperature and barometric pressure variations on said bridge which affects said potential differences.

References Cited in the file of this patent

UNITED STATES PATENTS

| Number | Name | Date |
| --- | --- | --- |
| 1,453,688 | Milker | May 1, 1923 |
| 1,753,230 | Best | Apr. 8, 1930 |
| 1,855,774 | Schneider | Apr. 26, 1932 |
| 2,501,377 | Cherry | Mar. 21, 1950 |
| 2,593,313 | Kamme et al. | Apr. 15, 1952 |

FOREIGN PATENTS

| Number | Country | Date |
| --- | --- | --- |
| 947,588 | France | Jan. 10, 1949 |